US012795341B2

(12) United States Patent
Bhanot et al.

(10) Patent No.: US 12,795,341 B2
(45) Date of Patent: Nov. 10, 2026

(54) PROVIDING EMERGENCY ALERTS TO USER EQUIPMENT WITHOUT TERRESTRIAL COVERAGE VIA SATELLITE

(71) Applicant: T-MOBILE INNOVATIONS LLC, Overland Park, KS (US)

(72) Inventors: Shilpa Sarabjit Bhanot, Sammamish, WA (US); Anthony James Wageman, Lees Summit, MO (US); Thomas Joseph Cast, Unincorporated King County, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 236 days.

(21) Appl. No.: 18/591,742

(22) Filed: Feb. 29, 2024

(65) Prior Publication Data

US 2025/0280278 A1 Sep. 4, 2025

(51) Int. Cl.

*H04W 4/90* (2018.01)
*H04W 48/10* (2009.01)
*H04W 88/06* (2009.01)

(52) U.S. Cl.

CPC ............. *H04W 4/90* (2018.02); *H04W 48/10* (2013.01); *H04W 88/06* (2013.01)

(58) Field of Classification Search

CPC ....... H04W 4/90; H04W 64/00; H04W 76/20; H04W 8/06; H04W 4/12; H04W 72/23; H04W 48/78; H04W 60/00; H04W 8/04; H04W 76/50

USPC ....................................................... 455/404.1

See application file for complete search history.

(56) References Cited

U.S. PATENT DOCUMENTS

| | | | | |
|---|---|---|---|---|
| 2022/0052753 | A1* | 2/2022 | Speidel | H04B 7/18513 |
| 2024/0138024 | A1* | 4/2024 | Huang | H04W 76/50 |
| 2024/0236833 | A1* | 7/2024 | Roy | H04B 7/18513 |
| 2025/0240604 | A1* | 7/2025 | Edge | H04W 4/90 |
| 2025/0247682 | A1* | 7/2025 | Tugnawat | H04W 64/00 |
| 2026/0019976 | A1* | 1/2026 | Agarwal | H04W 48/18 |

* cited by examiner

*Primary Examiner* — Maria El-Zoobi

(74) *Attorney, Agent, or Firm* — SHOOK, HARDY & BACON L.L.P.

(57) ABSTRACT

Systems and methods are provided for providing wireless emergency alerts (e.g., weather alerts, missing persons alerts, earthquake alerts, etc.) to UEs even when terrestrial coverage is not available. For example, a UE typically performs a RAT scan to identify an available PLMN. In some aspects, the UE is capable of receiving satellite signals but is not subscribed to a satellite service. If the RAT cycle completes without identifying an available PLMN, the UE begins searching for an EA PLMN provided by a satellite service. Upon detecting the EA PLMN, the UE passively monitors the EA PLMN for a SIB12 broadcast message for a configurable amount of time. Upon receiving the SIB12 broadcast message comprising an emergency alert, the UE provides the emergency alert (such as via an audible sound via speakers of the UE or on a display via a user interface of the UE).

20 Claims, 3 Drawing Sheets

PROVIDING EMERGENCY ALERTS TO USER EQUIPMENT WITHOUT TERRESTRIAL COVERAGE VIA SATELLITE

SUMMARY

Embodiments of the technology described herein are directed to, among other things, systems and methods for providing emergency alerts to user equipment (UE). More particularly, wireless emergency alerts (e.g., weather alerts, missing persons alerts, earthquake alerts, etc.) can be provided to UEs even when terrestrial coverage is not available. For example, a UE typically performs a radio access technology (RAT) scan to identify an available public land mobile network (PLMN). In some aspects, the UE is capable of receiving satellite signals but is not subscribed to a satellite service. If the RAT cycle completes without identifying an available PLMN, the UE begins searching for an emergency alert (EA) PLMN. For clarity, the EA PLMN is provided by a satellite service. Upon detecting the EA PLMN, the UE passively monitors the EA PLMN for a System Information Block 12 (SIB12) broadcast message for a configurable amount of time. Upon receiving the SIB12 broadcast message comprising an emergency alert, the UE provides the emergency alert (such as via an audible sound via speakers of the UE or on a display via a user interface of the UE). In aspects, once the emergency alert is provided, the UE restarts the RAT scan cycle.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
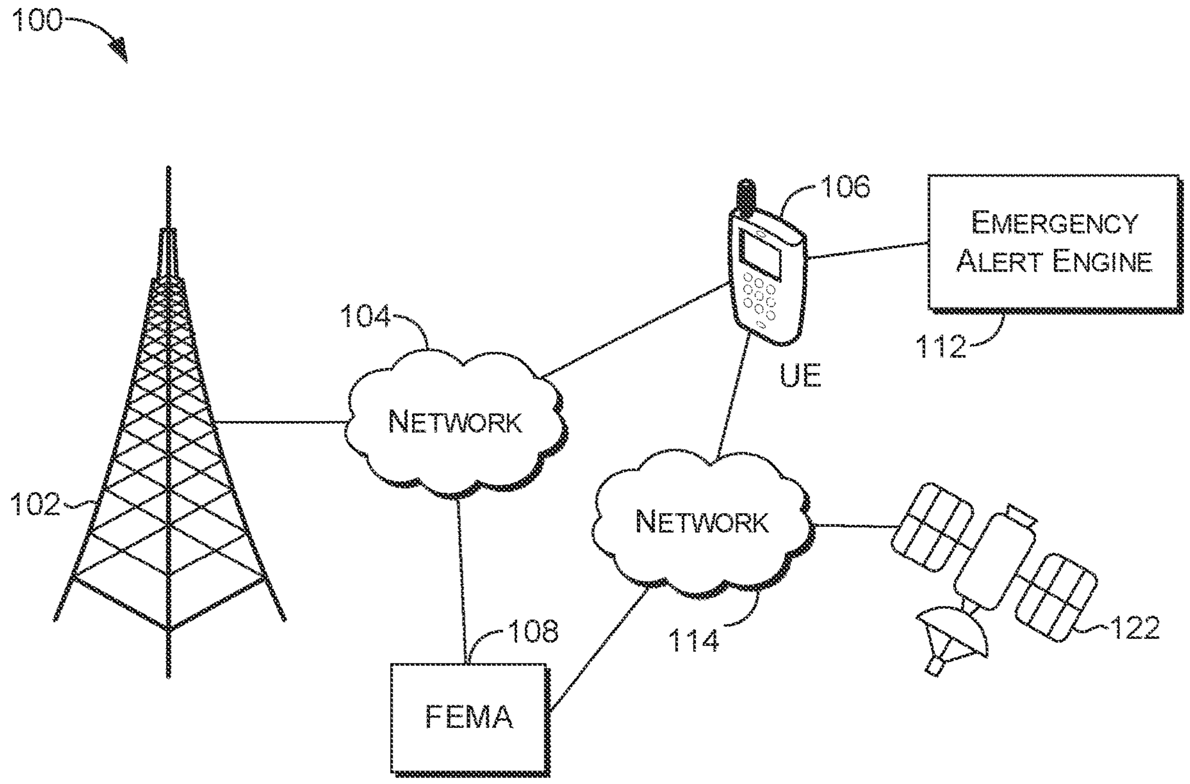
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 32$^{nd}$ Edition (2022).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service.

The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network.

For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE may be, in an embodiment, similar to device 400 described herein with respect to FIG. 4.

Wireless emergency alerts may be initiated by a government agency through Federal Emergency Management Agency (FEMA) for validation and approval. Once the wireless emergency alert is validated by FEMA, the impacted cell IDs for the alert area are identified. The wireless emergency alert is then forwarded to MMEs to notify the cells that are required to broadcast the alert. Affected network services providers broadcast the wireless emergency alert immediately to the targeted geographic area to camped and connected devices only. If a UE cannot establish terrestrial coverage and is not subscribed to a satellite service, the UE is unable to receive and provide the wireless emergency alert to a user of the UE.

The present disclosure is directed to systems, methods, and computer readable media that provide wireless emergency alerts (e.g., weather alerts, missing persons alerts, earthquake alerts, etc.) to UEs even when terrestrial coverage is not available. For example, a UE typically performs a radio access technology (RAT) scan to identify an available public land mobile network (PLMN). If the RAT cycle completes without identifying an available PLMN, the UE begins searching for an emergency alert (EA) PLMN. For clarity, the EA PLMN is provided by a satellite service. Upon detecting the EA PLMN, the UE passively monitors the EA PLMN for a System Information Block 12 (SIB12) broadcast message for a configurable amount of time. Upon receiving the SIB12 broadcast message comprising an emergency alert, the UE provides the emergency alert (such as via an audible sound via speakers of the UE or on a display via a user interface of the UE).

In some aspects, the UE is capable of receiving satellite signals (e.g., a band 25 capable device) but is not subscribed to a satellite service. The UE may be enabled for disaster roaming with other carriers (a satellite providing an EA PLMN); however, disaster roaming may be restricted to registration only (e.g., no voice, no SMS, no data). Once the emergency alert is provided, the UE may restart the RAT scan cycle. Subsequently, upon identifying and connecting to a PLMN, a duplicate of the emergency alert is not provided to the UE.

According to aspects of the technology described herein, one or more computer-readable media having computer-executable instructions embodied thereon that, when executed, perform a method of providing an emergency alert to a UE without terrestrial coverage via satellite. The method comprises initiating, by the UE, a radio access technology (RAT) scan cycle to identify an available public land mobile network (PLMN). The method also comprises, upon the RAT scan cycle completing without identifying the available PLMN, search, by the UE, for an emergency alert (EA) PLMN. The method further comprises, upon detecting the EA PLMN, passively monitor the EA PLMN, at the UE, for a System Information Block 12 (SIB12) broadcast message for a configurable amount of time. The method also comprises, upon receiving the SIB12 broadcast message comprising an emergency alert, provide, by the UE, the emergency alert.

According to further aspects of the technology described herein, a method of providing emergency alerts to user equipment (UE) without terrestrial coverage via satellite is provided. The method comprises initiating, by the UE, a radio access technology (RAT) scan cycle to identify an available public land mobile network (PLMN). The method also comprises, upon the RAT scan cycle completing without identifying the available PLMN, search, by the UE, for an emergency alert (EA) PLMN. In aspects, the UE is capable of receiving satellite signals but is not subscribed to a satellite service. The method further comprises, upon detecting the EA PLMN, passively monitor the EA PLMN, at the UE, for a System Information Block 12 (SIB12) broadcast message for a configurable amount of time. The method also comprises, upon receiving the SIB12 broadcast message comprising an emergency alert, provide, by the UE, the emergency alert.

According to even further aspects of the technology described herein, a system of providing emergency alerts to user equipment (UE) without terrestrial coverage via satellite is provided. The system comprises a node configured to wirelessly communicate with UE via a public land mobile network (PLMN). The system also comprises a satellite configured to provide emergency alerts to the UE via an emergency alert (EA) PLMN. The system further comprises the UE configured to: initiate, a radio access technology scan cycle to identify the PLMN; upon the RAT scan cycle completing without identifying the PLMN, search for the EA PLMN; upon detecting the EA PLMN, passively monitor the EA PLMN for a System Information Block 12 (SIB12) broadcast message for a configurable amount of time; and upon receiving the SIB12 broadcast message comprising an emergency alert, provide the emergency alert.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
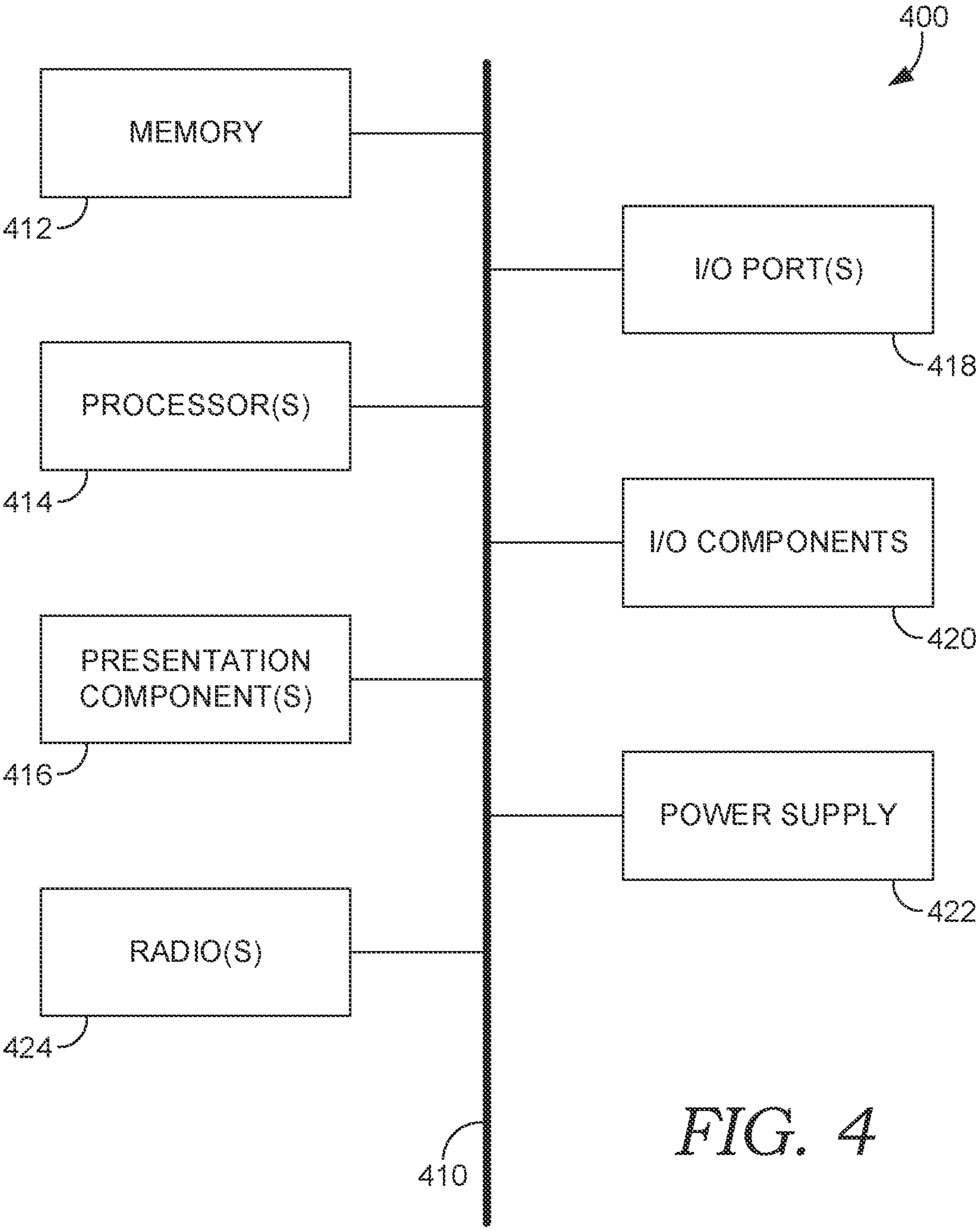
FIG. 4 depicts an example computing environment suitable for use in implementation of the present disclosure.

A network cell may comprise a base station to facilitate wireless communication between a communications device within the network cell, such as communications device 400 described with respect to FIG. 4, and a network. As shown in FIG. 1, a communications device may be a UE 106. In the network environment 100, UE 106 may communicate with other devices, such as mobile devices, servers, etc. The UE 106 may take on a variety of forms, such as a personal computer, a laptop computer, a tablet, a netbook, a mobile phone, a Smart phone, a personal digital assistant, or any other device capable of communicating with other devices. For example, the UE 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 106 comprises a wireless or mobile device with which a wireless telecommunication network(s) can be utilized for communication (e.g., voice and/or data communication). In this regard, the UE 106 can be any mobile computing device that communicates by way of, for example, a 5G network.

The UE 106 may utilize networks 104, 114 to communicate with other computing devices (e.g., mobile device(s), a server(s), a personal computer(s), etc.). In aspects, network 104 is a telecommunications network, or a portion thereof, while network 114 is a satellite communications network. A telecommunications network might include an array of devices or components, some of which are not shown so as to not obscure more relevant aspects of the invention. Components such as terminals, links, and nodes (as well as other components) may provide connectivity in some embodiments. Networks 104, 114 may include multiple networks, as well as being a network of networks, but is shown in more simple form so as to not obscure other aspects of the present disclosure. Network 104 may be part of a telecommunications network that connects subscribers to their immediate service provider. In embodiments, network 104 is associated with a telecommunications provider that provides services to user devices, such as UE 106. For example, network 104 may provide voice services to user devices or corresponding users that are registered or subscribed to utilize the services provided by a telecommunications provider. It is contemplated network 104 can be any communication network providing voice and/or data service (s), such as, for example, a 1× circuit voice, a 3G network (e.g., CDMA, CDMA1000, WCDMA, GSM, UMTS), a 4G network (WiMAX, LTE, HSDPA), or the like.

The network environment 100 may include a database (not shown). The database may be similar to the memory component 412 in FIG. 4 and can be any type of medium that is capable of storing information. The database can be any collection of records (e.g., emergency alerts provided by FEMA). In one embodiment, the database includes a set of embodied computer-executable instructions that, when executed, facilitate various aspects disclosed herein. These embodied instructions will variously be referred to as "instructions" or an "application" for short.

As previously mentioned, the UE 106 may communicate with other devices by using a base station, such as base station 102. In embodiments, base station 102 is a wireless communications station that is installed at a fixed location, such as at a radio tower, as illustrated in FIG. 1. The radio tower may be a tall structure designed to support one or more antennas for telecommunications and/or broadcasting. In other embodiments, base station 102 is a mobile base station. The base station 102 may be an MMU and include gNodeB for mMIMO/5G communications via network 104. In this way, the base station 102 can facilitate wireless communication between UE 106 and network 104.

As stated, the base station 102 may include a radio (not shown) or a remote radio head (RRH) that generally communicates with one or more antennas associated with the base station 102. In this regard, the radio is used to transmit signals or data to an antenna associated with the base station 102 and receive signals or data from the antenna. Communications between the radio and the antenna can occur using any number of physical paths. A physical path, as used herein, refers to a path used for transmitting signals or data. As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 102 may include at least one transceiver configured to receive and transmit signals or data.

Network 114, may be part of a satellite communications network that connects subscribers to their satellite services provider. In embodiments, network 114 is associated with a satellite services provider that provides services to user devices, such as UE 106, via a satellite 122. The satellite 122 can facilitate wireless communication between UE 106 and network 114.

In practice, a government agency may initiate an emergency alert. After FEMA 108 validates and approves the alert, impacted cell IDs for the alert area are identified. The alert is then forwarded to alert mobility management entities (MMEs) to notify the cells that are required to broadcast the alert. Affected network services providers immediately broadcast the emergency alert to the targeted geographic area to camped and connected devices. If a UE has just entered the area or is in the area and is not currently connected to a PLMN, the UE initiates a RAT cycle to identify a PLMN. However, if the UE is unable to establish terrestrial coverage, the UE begins searching for an EA PLMN. In some aspects, the EA PLMN is defined by the subscriber identity module and enables a UE without terrestrial coverage to temporarily connect to a satellite provider). If the UE is able to detect the EA PLMN, the UE begins passively monitoring the EA PLMN for a SIB12 broadcast message for a configurable amount of time. Although described as a SIB12 message, it is contemplated and within the scope of this disclosure that the UE may passively monitor other system information block broadcast messages (e.g., SIB24). If the UE receives the SIB12 broadcast message comprising an emergency alert, the UE provides the emergency alert. After the UE provides the emergency alert or if the UE does not receive the SIB12 broadcast message within the configurable amount of time, the UE restarts the RAT scan cycle.

Continuing, the network environment 100 may further include an emergency alert engine 112. The emergency alert engine 112 may be configured to, among other things, received and provide wireless emergency alerts (e.g., weather alerts, missing persons alerts, earthquake alerts, etc.) even when terrestrial coverage is not available, in accordance with the present disclosure. Though emergency alert engine 112 is illustrated as a component of UE 106 in FIG. 1, it may be a standalone device (e.g., a server having one or more processors), a service provided via the networks 104, 114, a component of the node 102 or satellite 122, or may be remotely located.

Figure 2:
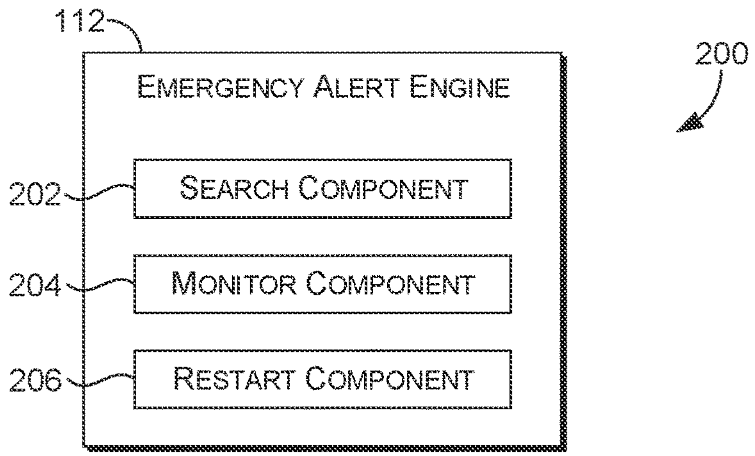
FIG. 2 illustrates a diagram of an emergency alert engine, in accordance with aspects herein.

Referring now to FIG. 2, the emergency alert engine 112 may include, among other things, search component 202, monitor component 204, and restart component 206. The emergency alert engine 112 may receive, among other things, data from user devices, such as UE 106. Additionally or alternatively, the emergency alert engine 112 may receive, among other things, data from base station 102, such as data from a gNodeB or eNodeB or from a plurality of base stations, or data from satellite 122. For example, the emergency alert engine 112 may receive and store emergency alerts so duplicate alerts are not provided by the UE 106.

Search component 202 generally initiates, a RAT scan cycle to identify a PLMN so the UE can camp and connect to a node. If the RAT scan cycle completes and the UE is unable to identify the PLMN, search component 202 begins searching for an EA PLMN. A satellite may be configured to provide emergency alerts to UEs via the EA PLMN. In some aspects, the UE is enabled for disaster roaming with other carriers (e.g., a satellite providing an EA PLMN). However, the UE may be restricted to registration only (e.g., no voice, no SMS, no data) while disaster roaming.

Monitor component 204 generally passively monitors the EA PLMN for a SIB12 broadcast message for a configurable amount of time. For example, monitor component 204 may passively monitor the EA PLMN for 10 seconds before instructing the restart component 206 to restart the RAT scan cycle. Upon a SIB12 broadcast message comprising the emergency alert being received, monitor component causes the emergency alert to be provided. For example, the UE may provide an audible signal via speakers of the UE, a textual or visual alert via a display of the UE, or haptic feedback via a vibrating component or an actuator of the UE.

Restart component 206 restarts the RAT scan cycle after the UE provides the emergency alert. In some aspects, restart component 206 restarts the RAT scan cycle if the UE does not receive the SIB 12 broadcast message before the configurable amount of time elapses.

Figure 3:
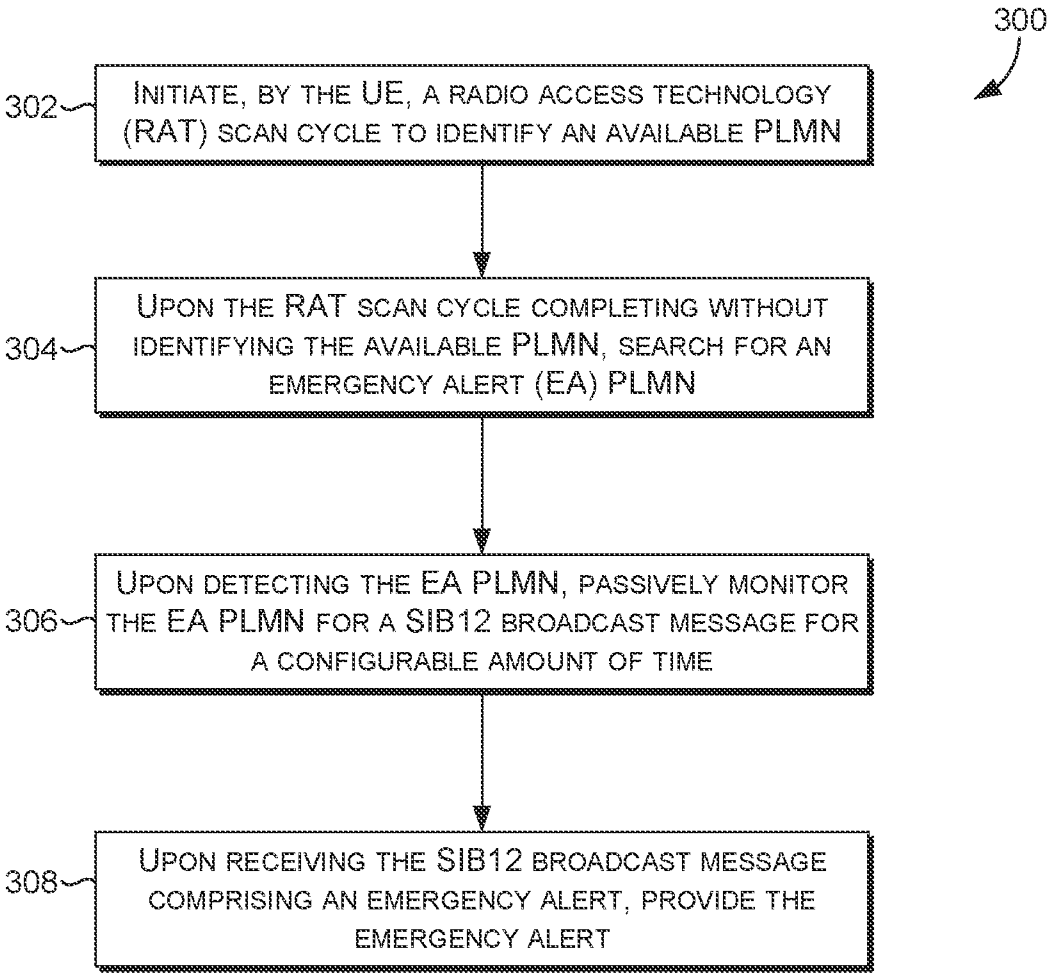
FIG. 3 is a flow diagram of an example method of providing an emergency alert to a UE without terrestrial coverage via satellite, in accordance with some aspects of the technology described herein.

Turning now to FIG. 3, a flow diagram is provided depicting an example method of providing an emergency alert to a UE without terrestrial coverage via satellite, in accordance with some aspects of the technology described herein. Method 300 may be performed by any computing device (such as computing device described with respect to FIG. 3) with access to an emergency alert engine (such as the one described with respect to FIGS. 1 and 2) or by one or more components of the network environment described with respect to FIG. 1 (such as UE 106, base station 102, satellite 122, or emergency alert engine 112).

Initially, although not shown by FIG. 3, a wireless emergency alert may be initiated by a government agency through FEMA for validation and approval. Once the wireless emergency alert is validated by FEMA, the impacted cell IDs for the alert area are identified. The wireless emergency alert is then forwarded to MMEs to notify the cells that are required to broadcast the alert. Affected network services providers broadcast the wireless emergency alert immediately to the targeted geographic area to camped and connected devices only.

At step 302, a UE entering an alert area initiates a RAT scan cycle to identify an available PLMN in an attempt to connect to the terrestrial network. In some aspects, the UE is capable of receiving satellite signals (i.e., band 25 capable). Additionally or alternatively, the UE is not subscribed to a satellite service. In some aspects, the UE fails to identify an available PLMN during the RAT cycle.

After the RAT scan cycle completes without identifying an available PLMN in the alert area, the UE begins searching, at step 404, for an EA PLMN. For clarity, a satellite is configured to provide emergency alerts to UEs via an EA PLMN. In some aspects, the UE is enabled for disaster roaming with other carriers (e.g., a satellite providing an EA PLMN). However, the UE may be restricted to registration only (e.g., no voice, no SMS, no data) while disaster roaming.

At step 406, upon detecting the EA PLMN, the UE passively monitors the EA PLMN for a SIB12 broadcast message for a configurable amount of time. For example, the UE may passively monitor the EA PLMN for the SIB12 broadcast message for 10 seconds. During this time, the UE will not connect or camp on the EA PLMN and will not send any uplink traffic.

Upon receiving the SIB12 broadcast message comprising an emergency alert, the UE provides the emergency alert.

For example, the UE may provide an audible signal via speakers of the UE. In another example, the UE may provide via a display of the UE a textual or visual alert. In yet another example, the UE may provide haptic feedback via a vibrating component or an actuator of the UE.

In some aspects, upon providing the emergency alert (or the UE being unable to detect the EA PLMN), the RAT scan cycle is restarted. Upon identifying and connecting to the available PLMN, the UE does not provide a duplicate of the emergency alert unless the emergency alert is rebroadcast.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VOLTE, or other VOIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method of providing an emergency alert to user equipment (UE) without terrestrial coverage via satellite, the method comprising:

initiating, by the UE, a radio access technology (RAT) scan cycle to identify an available public land mobile network (PLMN);

upon the RAT scan cycle completing without identifying the available PLMN, search, by the UE, for an emergency alert (EA) PLMN;

upon detecting the EA PLMN, passively monitor the EA PLMN, at the UE, for a System Information Block 12 (SIB12) broadcast message for a configurable amount of time; and upon receiving the SIB12 broadcast message comprising an emergency alert, provide, by the UE, the emergency alert.

2. The media of claim 1, further comprising determining the PLMN is not available.

3. The media of claim 1, wherein the UE is capable of receiving satellite signals.

4. The media of claim 3, wherein the UE is not subscribed to a satellite service.

5. The media of claim 1, further comprising not sending uplink signals to the EA PLMN.

6. The media of claim 1, further comprising, upon providing the emergency alert, restarting the RAT scan cycle.

7. The media of claim 6, further comprising, upon identifying the available PLMN, not providing, by the UE, a duplicate of the emergency alert.

8. The media of claim 1, wherein the UE is enabled for disaster roaming with other carriers.

9. The media of claim 8, wherein the disaster roaming is restricted to registration only.

10. A method of providing an emergency alert to user equipment (UE) without terrestrial coverage via satellite, the method comprising:

initiating, by the UE, a radio access technology (RAT) scan cycle to identify an available public land mobile network (PLMN);

upon the RAT scan cycle completing without identifying the available PLMN, search, by the UE, for an emergency alert (EA) PLMN, the UE capable of receiving satellite signals but not subscribed to a satellite service;

upon detecting the EA PLMN, passively monitor the EA PLMN, at the UE, for a System Information Block 12 (SIB12) broadcast message for a configurable amount of time; and upon receiving the SIB12 broadcast message comprising an emergency alert, provide, by the UE, the emergency alert.

11. The method of claim 10, further comprising determining the PLMN is not available.

12. The method of claim 10, further comprising not sending uplink signals to the EA PLMN.

13. The method of claim 10, further comprising, upon providing the emergency alert, restarting the RAT scan cycle.

14. The method of claim 13, further comprising, upon identifying the available PLMN, not providing, by the UE, a duplicate of the emergency alert.

15. The method of claim 10, wherein the UE is enabled for disaster roaming with other carriers.

16. The method of claim 15, wherein the disaster roaming is restricted to registration only.

17. A system of providing an emergency alert to user equipment (UE) without terrestrial coverage via satellite, the system comprising:

a node configured to provide services to user equipment (UE) via a public land mobile network (PLMN);

a satellite configured to provide emergency alerts to the UE via an emergency alert (EA) PLMN; and the UE configured to:

(1) initiate, a radio access technology (RAT) scan cycle to identify the PLMN;

(2) upon the RAT scan cycle completing without identifying the PLMN, search for the EA PLMN;

(3) upon detecting the EA PLMN, passively monitor the EA PLMN for a System Information Block 12 (SIB12) broadcast message for a configurable amount of time; and (4) upon receiving the SIB12 broadcast message comprising the emergency alert, provide the emergency alert.

18. The system of claim 17, wherein the UE is capable of receiving satellite signals.

19. The system of claim 18, wherein the UE is not subscribed to a satellite service.

20. The system of claim 17, further comprising, upon providing the emergency alert, restarting the RAT scan cycle.

* * * * *